US009302231B2

(12) United States Patent
DuBois et al.

(10) Patent No.: US 9,302,231 B2
(45) Date of Patent: Apr. 5, 2016

(54) SEED TREATING DEVICE

(75) Inventors: Jerry DuBois, West Des Moines, IA (US); Scott Bohemann, Des Moines, IA (US)

(73) Assignee: DUBOIS AGRICULTURAL ENGINEERING INCORPORATED, West Des Moines, IA (US)

(*) Notice: Subject to any disclaimer, the term of this patent is extended or adjusted under 35 U.S.C. 154(b) by 744 days.

(21) Appl. No.: 13/438,492

(22) Filed: Apr. 3, 2012

(65) Prior Publication Data

US 2013/0255571 A1 Oct. 3, 2013

(51) Int. Cl.

| | |
|---|---|
| ***A01C 1/06*** | (2006.01) |
| ***B05C 3/09*** | (2006.01) |
| ***B01F 15/04*** | (2006.01) |
| ***B01F 15/02*** | (2006.01) |
| ***B01F 7/00*** | (2006.01) |
| ***B01F 7/02*** | (2006.01) |

(52) U.S. Cl.
CPC ............. *B01F 7/001* (2013.01); *B01F 7/00275* (2013.01); *B01F 7/021* (2013.01)

(58) Field of Classification Search
CPC .............. B01F 7/001; A01C 1/06; A01C 1/00
USPC ................ 366/192, 193, 330.1, 330.3, 76.93, 366/76.1, 76.2; 241/37.5; 47/57.6
See application file for complete search history.

(56) References Cited

U.S. PATENT DOCUMENTS

| | | | | |
|---|---|---|---|---|
| 1,558,580 | A * | 10/1925 | Bishop | 366/157.2 |
| 2,862,511 | A * | 12/1958 | Forsberg | 134/187 |
| 3,213,867 | A * | 10/1965 | McIntyre | 134/172 |
| 3,589,686 | A * | 6/1971 | Russell, Jr. | 366/139 |
| 3,696,903 | A * | 10/1972 | Nethersell | 192/136 |
| 3,717,086 | A * | 2/1973 | Hough | 99/516 |
| 3,939,073 | A * | 2/1976 | Bats | 210/219 |
| 4,182,273 | A * | 1/1980 | Peterson | 119/51.5 |
| 4,275,682 | A * | 6/1981 | Weber | 118/303 |
| 4,465,017 | A * | 8/1984 | Simmons | 47/57.6 |
| 4,596,206 | A * | 6/1986 | Berge et al. | 118/303 |
| 4,628,807 | A * | 12/1986 | Dopp | 99/488 |
| 4,837,882 | A * | 6/1989 | Brenner et al. | 8/159 |
| 4,898,092 | A * | 2/1990 | Greer | 99/487 |
| 4,993,316 | A * | 2/1991 | Greer | 99/487 |
| 4,994,286 | A * | 2/1991 | Greer | 426/231 |
| 5,096,302 | A * | 3/1992 | Durina | 366/76.92 |
| 5,194,275 | A * | 3/1993 | Greer | 426/231 |
| 5,488,898 | A * | 2/1996 | Hough | 99/516 |
| 5,783,250 | A * | 7/1998 | Kohno | 427/4 |
| 5,830,271 | A * | 11/1998 | Kohno et al. | 118/13 |
| 5,993,903 | A * | 11/1999 | Toepfer et al. | 427/242 |
| 6,261,371 | B1 * | 7/2001 | Nakatsukasa et al. | 118/684 |
| 6,485,569 | B1 * | 11/2002 | Sarakas | 118/303 |

(Continued)

FOREIGN PATENT DOCUMENTS

| | | |
|---|---|---|
| WO | 9107631 | 5/1991 |
| WO | 0178507 | 10/2001 |

*Primary Examiner* — Tony G Soohoo
(74) *Attorney, Agent, or Firm* — Zarley Law Firm, P.L.C.

(57) ABSTRACT

A seed treating device that has an input device that is detachably secured to a frame. Disposed within the frame is a mixing chamber that receives seed from the input and is in fluid communication with a pump. In this manner the pump is able to convey chemical treatments to the interior of the mixing chamber such that a blade assembly within the mixing chamber can mix the chemical treatment fluid with seeds therein in order to treat the seeds with the chemical treatment.

14 Claims, 4 Drawing Sheets

(56) References Cited

U.S. PATENT DOCUMENTS

| | | | | |
|---|---|---|---|---|
| 6,789,935 | B2 * | 9/2004 | Binder et al. | 366/193 |
| 6,910,800 | B2 * | 6/2005 | Wu | 366/199 |
| 7,273,314 | B1 * | 9/2007 | Whited | 366/172.1 |
| 7,487,892 | B1 * | 2/2009 | Hirsch | 222/240 |
| 8,864,365 | B2 * | 10/2014 | Rodgers | 366/150.1 |
| 2002/0191481 | A1 * | 12/2002 | Cox et al. | 366/16 |
| 2005/0237852 | A1 * | 10/2005 | Chandran | 366/136 |
| 2011/0027479 | A1 * | 2/2011 | Reineccius et al. | 427/212 |
| 2012/0183675 | A1 * | 7/2012 | Reineccius et al. | 427/4 |
| 2012/0189762 | A1 * | 7/2012 | Reineccius et al. | 427/4 |
| 2013/0121101 | A1 * | 5/2013 | Ochampaugh et al. | 366/141 |
| 2013/0255571 | A1 * | 10/2013 | DuBois et al. | 118/423 |
| 2013/0273236 | A1 * | 10/2013 | Reineccius et al. | 427/4 |
| 2014/0108076 | A1 * | 4/2014 | Reineccius et al. | 705/7.12 |
| 2014/0318009 | A1 * | 10/2014 | Strahm et al. | 47/57.6 |

* cited by examiner

SEED TREATING DEVICE

BACKGROUND OF THE INVENTION

This invention relates to treating seeds. More specifically, this invention relates to a device that provides chemicals to seed for treatment.

For years companies have attempted to improve agricultural seeds by adding chemicals to the seeds in order to enhance yield, growth, and the like. Specifically, in addition to utilizing fertilizers and herbicides in the field seeds can be chemically treated before planting in order to improve crops yields, plant health, and the like.

Currently in the art a machine is provided that receives seeds within a chamber where chemicals are injected within the chamber for treatment of the seeds. This is typically done by the utilization of a syringe or other flow device that rapidly places the chemical fluid into the chamber. Presently, the amount of fluid used within the chamber is determined by the weight of the seed that is inputted into the chamber.

While this type of device is effective at introducing the seeds to the chemicals problems still remain. In particular, the chemicals utilized in treating the seeds are typically very expensive and a large amount of the chemicals are wasted during the treatment process. In particular, because a syringe is used and because the chemicals are added based on the weight of the seeds excess chemicals are pumped into the seed treating chamber thus creating waste and increased expense that is undesired. Thus, a need in the art exists for an improved device or method for treating seeds with chemicals.

Therefore, a principal object of the present invention is to provide a seed treating device that reduces the amount of chemicals needed to treat seeds.

Yet another object of the present invention is to provide a seed treating device that is efficient and eliminates waste.

These and other objects, advantages and features will become apparent from the specification and claims.

BRIEF SUMMARY OF THE INVENTION

A seed treating device that has an input secured to a frame. The frame has a mixing chamber for receiving seed from the input. A pump is fluidly connected to the chamber to provide a chemical treatment into the mixing chamber in order to chemically treat seeds therein.

DETAILED DESCRIPTION OF THE PREFERRED EMBODIMENT

Figure 1:
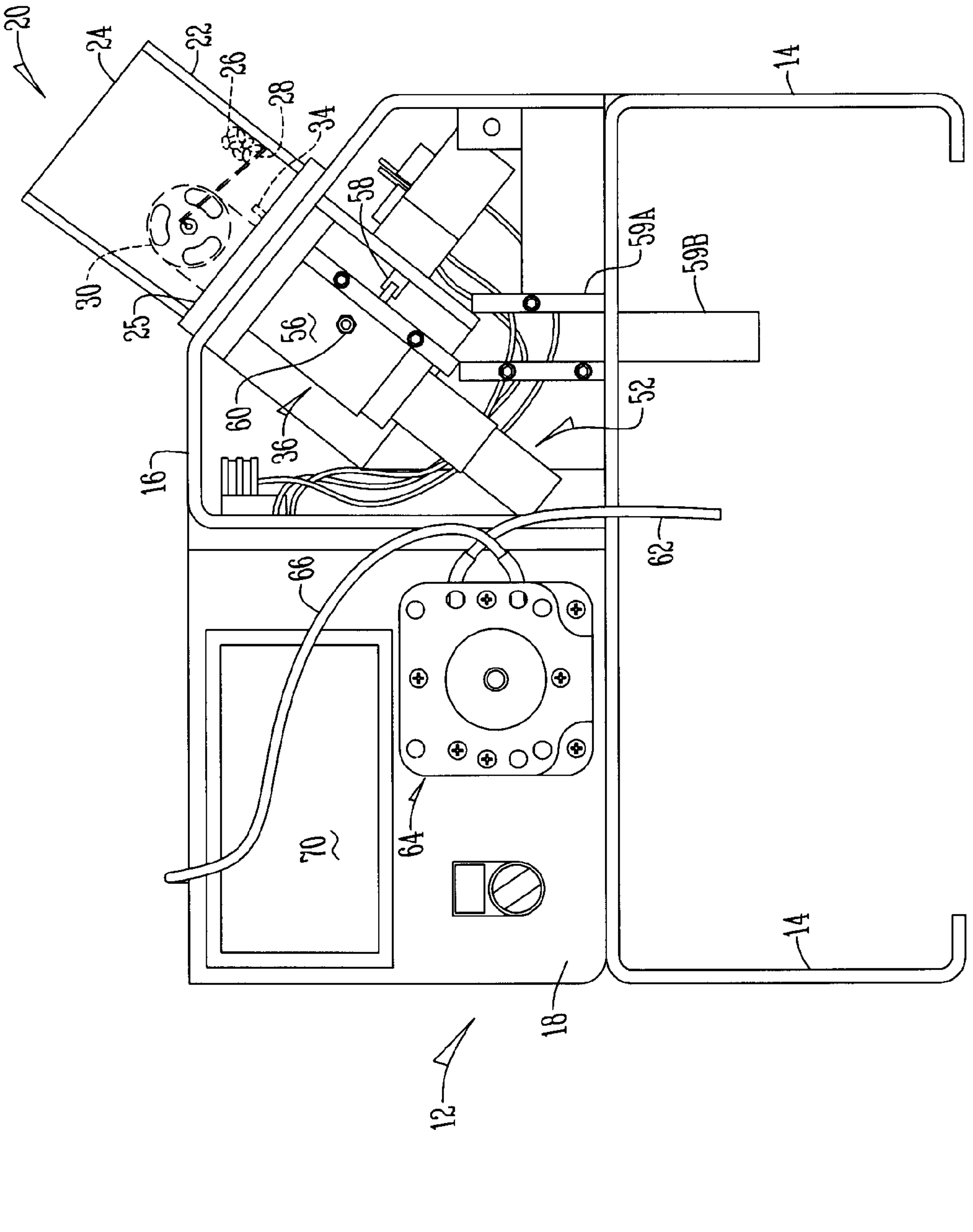
FIG. 1 is a perspective view of a seed treating device.
Figure 2:
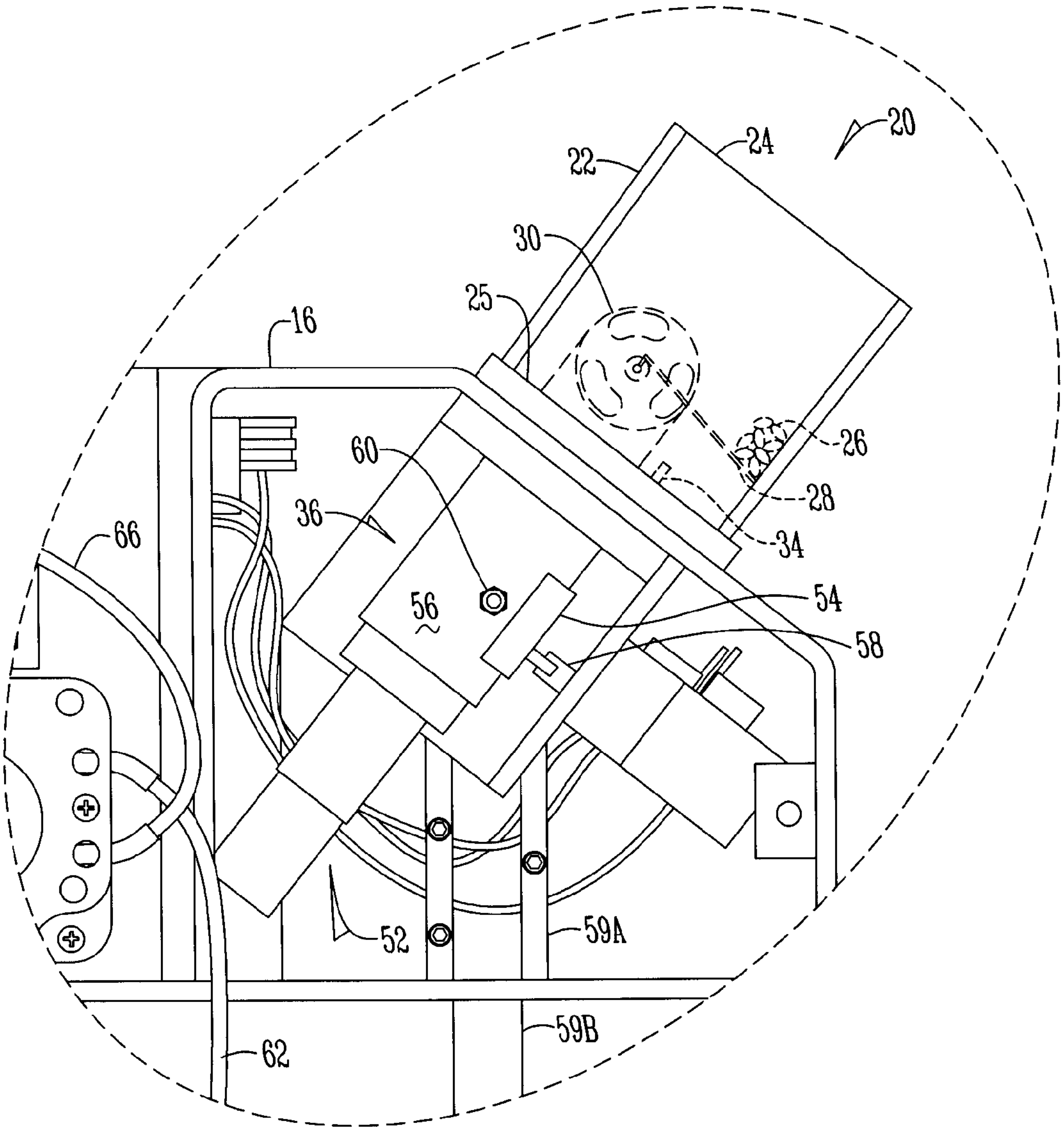
FIG. 2 is a side perspective view of a mixing chamber of a seed treating device.
Figure 3:
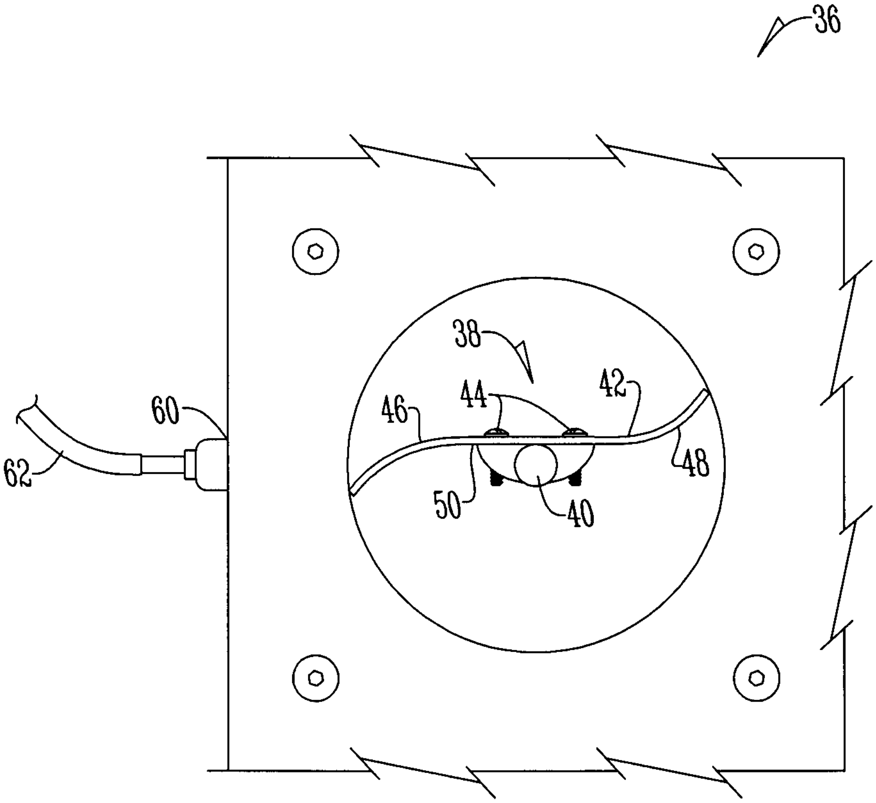
FIG. 3 is a top cut-away plan view of a mixing chamber of a seed treating device with an input removed.
Figure 4:
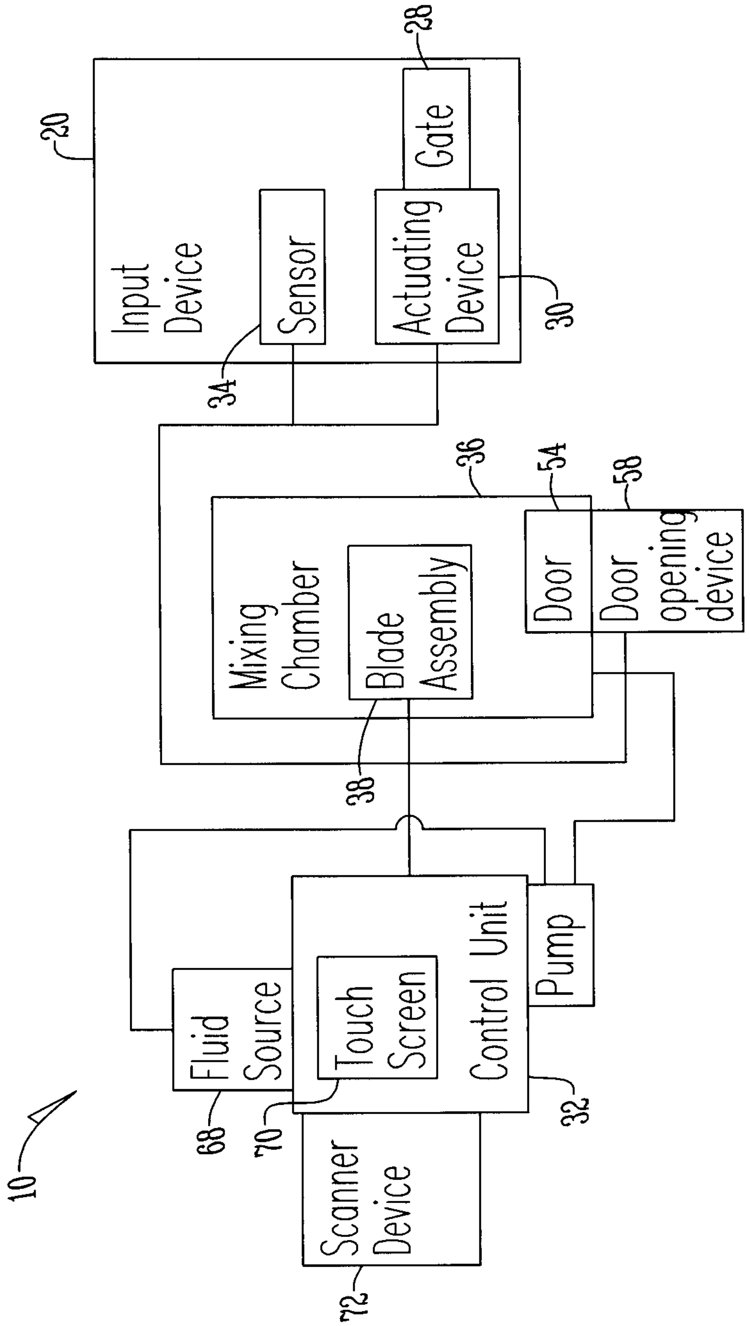
FIG. 4 is a schematic diagram of a seed treating device.

The figures show a seed treating device 10 having a frame 12 that includes support members 14 and a cabinet 16. Secured to the cabinet 16 is a transparent cover 18 that provides protection to the seed treating device 10 while still allowing an individual to see the operation of the device 10.

An input device 20 is detachably and hingeably secured to the frame 12. The input device 20 has a housing 22 with an opened first end 24 that extends to an open second end 25 for conveying seeds 26. The input housing 22 houses a gate 28 that is rotatably connected to a rotatable actuating device 30 that is positioned in the housing such in a first position seeds 26 cannot pass through the open second end 25 and in a second position the gate 28 is rotated to provide a communication path through the housing 22 from the first end 24 to the second end 25. The actuating device 30 is electrically connected to a control unit 32 in order to control the flow of seed through the input 20. The input 20 additionally has a sensor 34 that is electrically connected to the control unit 32 in order to send an electrical signal that indicates when the input 20 is pivoted away from or detached from the frame 12.

A mixing chamber 36 is disposed within the frame 12 adjacent the second open end 25 of the input 20 in order to receive seed 26 from the input 20. The mixing chamber 36 includes a blade assembly 38 that has a rotatable shaft 40 that is secured to a blade 42 via fastening elements 44. The blade 42 has first and second arcuate sections 46 and 48 separated by a straight section 50 where the fastening elements 44 secure the blade 42 to the rotatable shaft 40. The first and second arcuate sections 46 and 48 curve in opposite directions and are of size and shape to have minimum tolerance with the perimeter of the mixing chamber 36. The blade assembly 38 is actuated by an electric motor 52 that rotates the rotatable shaft 40 and is electrically connected to the control unit 32 such that when the control unit 32 receives an electronic signal from the sensor 34 that the input 20 is not resting against the frame 12 and instead is either detached or in an open position the control unit 32 is able to stop the actuation of the blade assembly 38 through the motor 52.

A door 54 is disposed through a sidewall 56 of the mixing chamber 36 to provide access to the interior of the mixing chamber 36. A door opening device 58 that in a preferred embodiment is a solenoid engages the door 54 and is in electric communication with the control unit 32 in order to control the opening and the closing of the door 54. A chute 59A and deposit tube 59B are positioned adjacent and underneath the door 54. In this manner when seeds 26 are adequately mixed with the treatment chemicals within the mixing chamber 36 the door 54 is opened and the seeds 26 fall out through the chute 59A and tube 59B to be collected.

A fluid inlet 60 is also disposed through the sidewall 56 of the mixing chamber 36. The fluid inlet 60 is coupled to a first fluid conduit 62 that is coupled to a pump 64 such that a fluid flow path is provided between the pump 64 in the mixing chamber 36. In a preferred embodiment the pump is a positive displacement fluid pump that is in electrical communication with the control unit 32 to provide a predetermined amount of fluid or chemical treatment into the mixing chamber 36. A second fluid conduit 66 is coupled to and extends from the pump 64 to a fluid source 68 that contains the chemical treatment in fluid to be pumped to the mixing chamber 36. Thus, a fluid source 68 can be a fluid reservoir to allow continuous operation of the device 10.

In order to input information an input screen 70 that preferably is a touch screen is provided that allows an individual to manually input information pertaining to the seeds 26 placed into the input device 20. This information is then used by the control unit 32 to determine the desired amount of chemical treatment fluid to convey to the mixing chamber 36 to treat the seeds 26 therein. A scanner 72 can optionally be electrically connected to the control unit 32 to provide an additional input for the control unit 32. In particular, instead of utilizing the touch screen input screen 70 to input information a scanner 72 can be utilized to read a barcode from a package of seeds that provides information about the seeds including the amount of seeds therein such that the control unit 32 calculates and determines the amount of chemical treatment fluid that is to be conveyed to the mixing chamber 36.

In operation, an individual either utilizes the input screen 70 or scanner 72 to input the amount of seed that will be conveyed into the mixing chamber 36. Based on this information the control unit 32 determines the amount of chemical treatment fluid that needs to be conveyed to the mixing chamber 36. At this time an individual places the plurality of seeds 26 into the input device 20 where the seeds are stopped from entering the mixing chamber 36 with the gate 28 until the control unit 32 determines the mixing chamber 36 is prepared to receive the seeds 26. At this time the actuating device 30 being controlled by the control unit 32 rotates the gate 28 to allow the seeds 26 to pass into the mixing chamber 36. The gate then returns back to its initial position and additional seeds 26 can be dumped into the input 20.

At this time the control unit 32 operates the pump 64 to convey chemical treatment fluid through the fluid inlet 60 into the mixing chamber 36. Simultaneously the control unit 32 actuates the electric motor 52 in order to operate the blade assembly 38 to create mixing of the seed 26 and the chemical treatment fluid within the mixing chamber 36. Once a predetermined amount of mixing has occurred the motor 52 is deactivated and the blade assembly 38 stops rotating. At this point in time control unit 32 opens the door 54 to allow the treated seeds to be collected. At this time the gate 28 can be actuated again to repeat the process.

Thus presented is a seed treating device 10 that utilizes a control unit 32 in order to pump the optimum amount of chemical treatment fluid into a mixing chamber 36 for treating seeds 26. In this manner only a minimum amount of chemical treatment fluid is utilized in the treating of the seeds 26. This allows for major cost savings in the use of the chemical treatment. Further, the system is easy to use utilizing touch screen technologies and scanning system technologies to input information into the control unit 32 to control the operation of the system 10. In addition, safety features are provided including the sensor 34 for determining when the input 30 is attached to the frame 12 in order to prevent operation of the blade assembly 38 unless the input device 20 is on the frame 12. Further, by having a transparent cover 18 an individual may observe the operation of the machine in order to detect any malfunctioning and to ensure the device 10 is operating appropriately. Thus, at the very least all of the stated objectives have been met.

It will be appreciated by those skilled in the art that other various modifications could be made to the device without departing from the spirit and scope of this invention. All such modifications and changes fall within the scope of the claims and are intended to be covered thereby.

What is claimed is:

1. A seed treating device comprising:

an input device having a housing with an open first end and an open second end secured to a frame wherein the input device is hingedly secured to the frame;

a gate element rotatably connected to the input device within the housing;

the frame having a mixing chamber with a blade assembly for receiving seed from the input device;

a pump fluidly connected to the mixing chamber to provide a chemical treatment into the mixing chamber; and a control unit in electrical communication with a sensor that detects when the input device is pivoted away from the frame and send an electrical signal to the control unit to prevent operation of the blade.

2. The device of claim 1 wherein the mixing chamber has a door electrically controlled by a control unit for dispensing seeds.

3. The device of claim 1 further comprising a control unit electrically controlling the pump to provide a predetermined amount of chemical treatment to the mixing chamber.

4. The device of claim 3 wherein the control unit has a touch screen input.

5. The device of claim 3 wherein the control unit is electrically connected to a solenoid that controls the position of a door of the mixing chamber.

6. The device of claim 3 further comprising a scanning device electrically connected to the control unit wherein based on information communicated from the scanning device to the control unit the operation of the pump is altered.

7. The device of claim 3 wherein a control unit determines the amount of chemical treatment to pump into the mixing chamber based on the amount of seed within the mixing chamber.

8. The device of claim 1 further comprising the gate rotatably connected to an actuating device positioned in the input device.

9. The device of claim 1 wherein when the gate is in a first position seed cannot pass through the input device and when in a second position seed can pass through the input device.

10. The device of claim 1 further comprising a control unit in electrical communication with the actuating device to control the passage of seed through the input device.

11. A seed treating device comprising:

an input device having a housing detachably secured to a frame;

a gate element positioned in the input device;

the frame having a mixing chamber with a blade assembly for receiving seed from the input device;

a pump fluidly connected to the mixing chamber to provide a chemical treatment into the mixing chamber; and a control unit in electrical communication with a sensor that detects when the input device is detached from the frame and send an electrical signal to the control unit to prevent operation of the blade assembly in the mixing chamber.

12. A seed treating device, comprising:

an input device having a housing secured to a frame;

a gate rotatably connected to the input device within the housing;

a mixing chamber in communication with the input device and having a door;

a chute in communication with the door; and a blade assembly with a first arcuate section and a second arcuate section separated by a straight section, wherein the first arcuate section and second arcuate section curve in opposite directions.

13. The device of claim 12 wherein the door is disposed through a sidewall of the mixing chamber.

14. The device of claim 12 further comprising a control unit that determines as amount of chemical treatment fluid conveyed to the mixing chamber, controls an actuating device that rotates the gate to allow seeds to pass into the mixing chamber, and opens the door when mixing is completed to collect treated seeds.

* * * * *